E. QUINN.
Steam Gage.
No. 62,885.
Patented March 12, 1867.
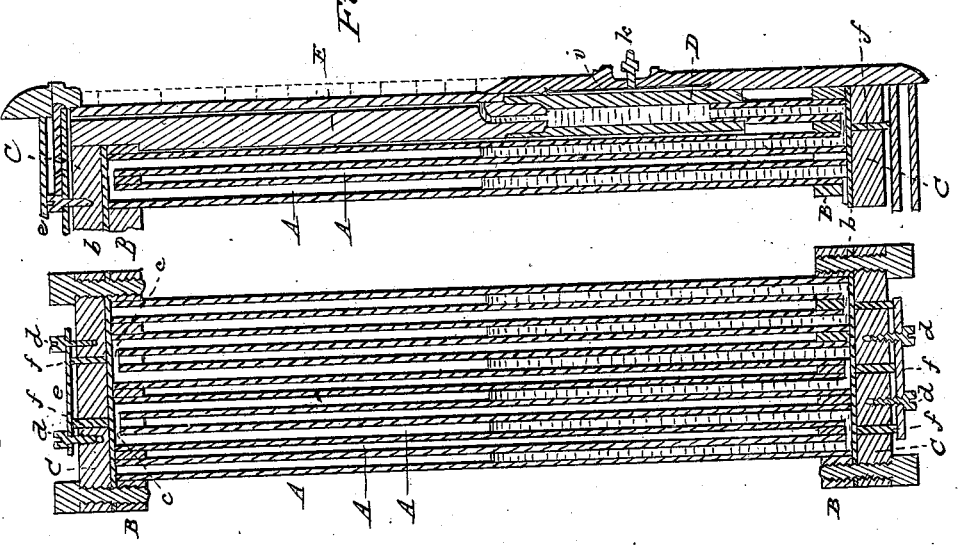

United States Patent Office.

EMMETT QUINN, OF WASHINGTON, DISTRICT OF COLUMBIA.

*Letters Patent No. 62,885, dated March 12, 1867.*

---

IMPROVEMENT IN STEAM GAUGES.

---

*The Schedule referred to in these Letters Patent and making part of the same.*

---

TO ALL WHOM IT MAY CONCERN:

Be it known that I, EMMETT QUINN, of Washington, District of Columbia, have invented a new and improved Gauge for Indicating the Pressure of Steam in Boilers; and I do hereby declare that the following is a full and exact description thereof, reference being had to the accompanying drawings, and to the letters of reference marked thereon.

This is an improvement on the gauge for which I obtained Letters Patent March 13, 1866, and is believed to be a better adaptation of the principle therein shown to the purpose for which it was designed, the supposed imperfections in the construction of the first being such as to affect its accuracy and usefulness. It is important that the gauge should be as compact as possible, and where a great number of tubes is required they should be so arranged as to occupy as little space between them as possible; and in the gauge alluded to too much space is required for the joints and cocks contained therein. There is also in said gauge no means provided to compensate for the expansion and contraction, by variations of temperature, of the fluids used and the irregular calibre of the final or index tube, which is of glass; and its constant liability to break, even with the most careful handling, renders it, especially for high-pressure and locomotive engines, somewhat impracticable. These difficulties and objections are effectually overcome by the improvements herein described, first, by inserting the whole series of tubes used in a gauge, in plates, one at each end of the tubes, with channels from one tube to another in said plates, as required, and covering the open ends of the tubes and the channels by a cap or outer plate secured to the tube plate and removable at pleasure for filling or other purposes, by which arrangement the tubes can be placed almost in contact with each other, and a gauge for high ranges of pressure can be put in a case not much exceeding in size an ordinary barometer; second, the simplification of the device for confining the movement of the fluids used while the gauge is being transported or handled; third, in lieu of the glass tube, substituting a compound one constructed in such a manner as to be of a uniform calibre throughout, much more durable, easier applied, and through the face of which the mercury therein is much more readily seen; fourth, a means of compensating for the variations of the zero point of the mercury caused by changes of temperature.

The following describes its construction and operation:

Figure 1, a front view of a longitudinal section.

Figure 2, a side view.

Figures 3 and 4, top and bottom tube plates, showing the arrangement of the channels from one tube to the other.

Figures 5 and 6, sectional end view and face view of the compound tube.

Figure 7, a face view of the gauge.

A A A, &c., are the tubes, B B the tube plates, and C C the outer or cap plates, with the packing $b$ $b$ between them. Portions of this packing over the channels or passages $c$ $c$, between the tubes, serve as elastic diaphragms by which to close said channels when the gauge is to be transported or handled, and is done by tightening the screws $d$ $d$ upon the plates $e$ $e$, which force the plungers $f f$ against the diaphragms, causing the latter to sink into and close the channels $c$ $c$, which are, when open, small enough to prevent a too rapid movement of the fluids when pressure is suddenly applied, and at the same time sufficiently large for the necessary operation of the gauge. By dispensing with the packing and causing the plates to slide upon each other, as in the case of ordinary slide valves, the communication between the tubes may be closed, but this is not considered practicable on account of the difficulty of making and keeping them perfectly tight, as is necessary in a gauge of the construction herein described. The greater portion of the lower half D of the last tube is elastic and connects with the index tube E, formed of wood, vulcanite, or other suitable material, in the face of which is a groove of a capacity the same as or less than the calibre of the tubes, and covered by plate glass cemented thereto and secured by clamps, as shown in figs. 5 and 6. The elastic tube D is of slightly greater calibre than the others, which confine it on three sides. By compressing or relieving this elastic tube by means of the set-screw $k$ and clamp $i$ the mercury is raised or lowered to compensate for changes caused by variations of temperature. The same result may be obtained by making the scale to slide up or down to the zero point of the mercury, or by lengthening and bowing the elastic tube so as to permit the raising or lowering the index tube and the surface of mercury therein to said zero point. Instead of an elastic tube, a metallic reservoir of any nvenient size and shape, with a flexible diaphragm, against which the pressure screw $k$ can operate, might be employed, but as the pressure on the reservoir is never over eight or ten pounds to the square inch an India-rubber tube is sufficiently strong and durable. A gauge constructed in a manner substantially the same as the above described, but with some slight modifications and improvements, answers admirably as a vacuum gauge, but as I intend making a separate application for patent for such modifications and improvements no description thereof will herein be given.

Having thus described my improvement, what I claim as my invention, and desire to secure by Letters Patent, is—

1. The tubes inserted in plates, as described, with the channels cut therein from one tube to another, and with cap or outer plate covering the channels and ends of the tubes as and for the purpose described.

2. The packing and diaphragms between the plates, with the plungers, for the purpose of cutting off communication between the tubes, as described.

3. The means provided for adjusting the mercury in the final or index tube to the zero point on the scale, or for adjusting said zero point to the mercury, in the manner described.

4. The construction of the index tube by a combination of a back piece, containing a groove of a suitable calibre with a glass face cemented to or clamped thereon, in the manner substantially as described.

5. The construction of the channels from tube to tube of a size sufficient for the necessary operation of the gauge, but too small to allow of a rapid movement of the fluids when pressure is suddenly applied.

EMMETT QUINN.

Witnesses:
　　EDM. F. BROWN,
　　J. H. PHILLIPS.